Figure 1:
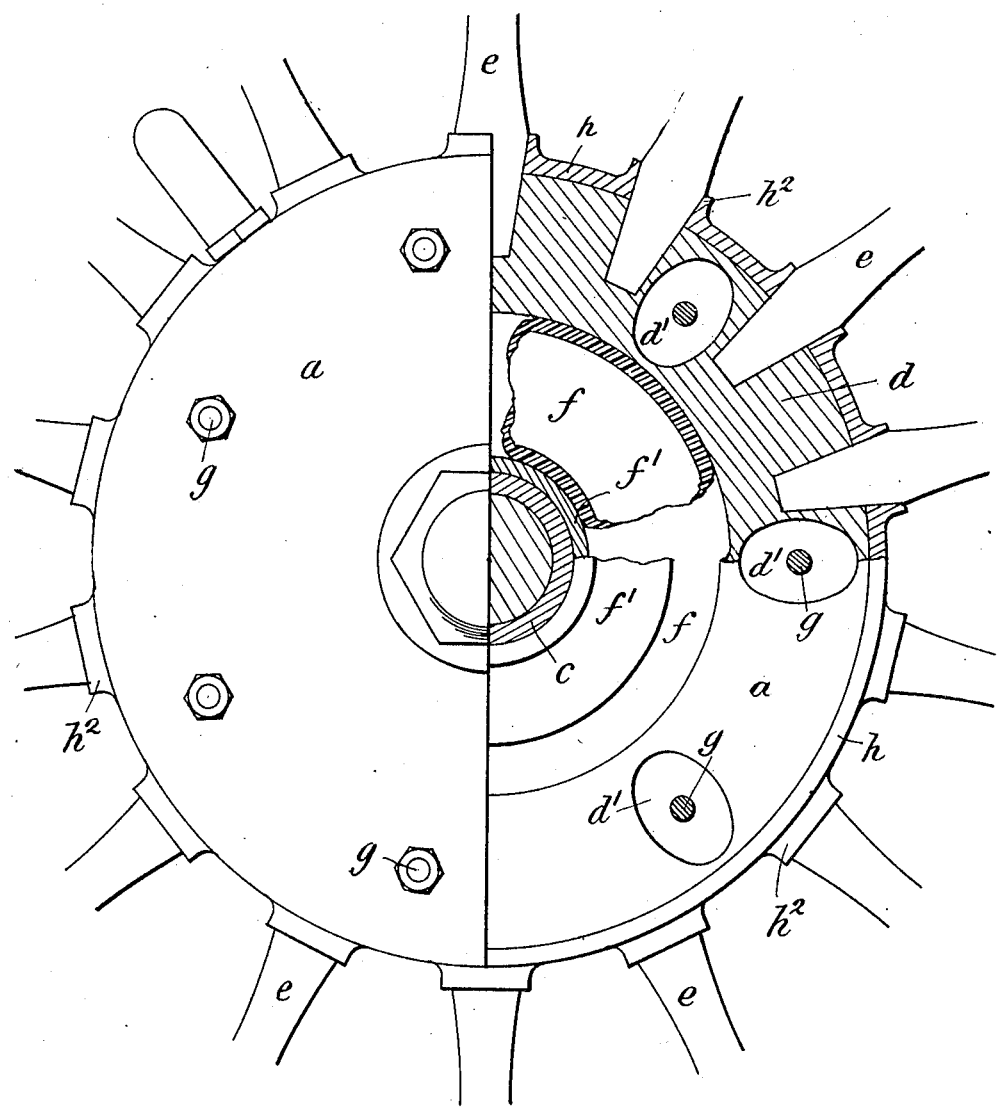

No. 857,092. PATENTED JUNE 18, 1907.
G. MIDDLETON.
PNEUMATIC HUB FOR VEHICLES.
APPLICATION FILED SEPT. 14, 1906.

2 SHEETS—SHEET 1

Attest:
S. Middleton
Edward N. Sarton

Inventor
George Middleton
By Richards & Co
Attys

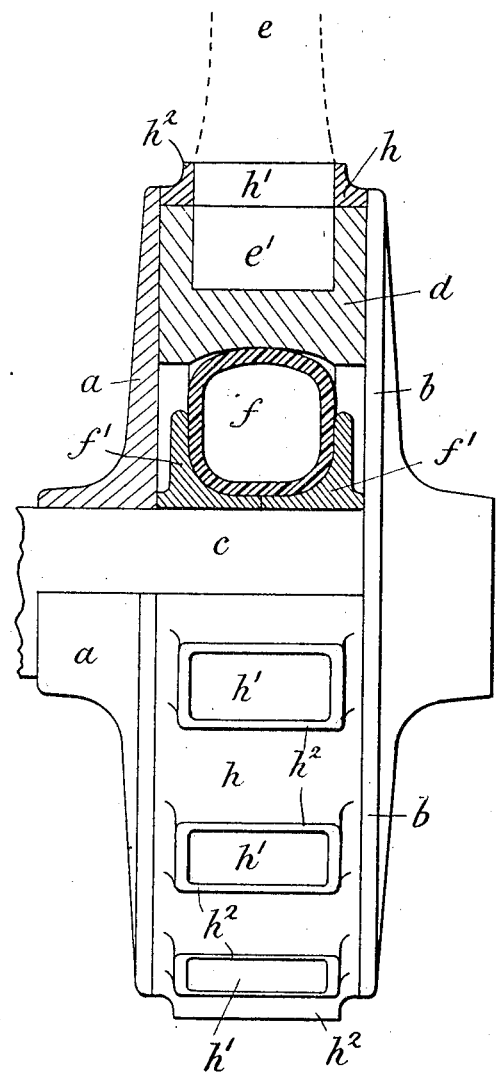

UNITED STATES PATENT OFFICE.

GEORGE MIDDLETON, OF LONDON, ENGLAND, ASSIGNOR TO THE MIDDLETON PNEUMATIC HUB COMPANY, (1906,) LIMITED, OF LONDON, ENGLAND.

PNEUMATIC HUB FOR VEHICLES.

No. 857,092.　　　Specification of Letters Patent.　　Patented June 18, 1907.

Application filed September 14, 1906. Serial No. 334,642.

*To all whom it may concern:*

Be it known that I, GEORGE MIDDLETON, coach-builder, a subject of the King of Great Britain, residing at 21 and 23 Cale street, Chelsea, London, England, have invented certain new and useful Improvements Relating to Pneumatic Hubs for Vehicles, of which the following is a specification.

In pneumatic hubs for vehicles and more particularly in that construction described in my previous patent No. 827,930, the spokes are shown fixed into a spoke drum which being made wholly of metal was very heavy, lifeless, and costly to manufacture.

The object of my present invention is to overcome these objections by constructing the drum of hard wood (for example, rock elm, which can be turned and worked into the desired shape) with a strengthening rim or band of metal which is fixed upon the periphery of the drum.

In the accompanying drawings, Figure 1 is a sectional front elevation and Fig. 2 is a sectional side elevation of a pneumatic hub constructed according to my invention.

$a, b$ are the two flanges, of which $b$ is integral with the axle sleeve $c$.

$d$ is the spoke drum in which the spokes $e$ are fixed.

$f$ is the pneumatic ring which is mounted upon a flanged rim $f'$ (which may be formed in two parts as shown) capable of rotating upon the axle sleeve $c$.

$g, g$ are bolts for securing the two flanges $a, b$, and the spoke drum $d$ in their proper position.

According to my present invention, I form the drum $d$ of a suitable hard wood (such as rock elm) and I fix upon the periphery thereof a metal rim or band $h$ which is formed with openings $h'$ for the spokes which openings are preferably surrounded by collars or flanges $h^2$ integral with the rim or band $h$. Preferably the band $h$ is shrunk upon the drum $d$ in an analogous manner to that by which the usual metal tire is fitted to a wheel of an ordinary road vehicle. The wood drum thus shod may then be turned interiorly to the desired shape and the spoke sockets $e'$ formed opposite the openings $h'$ in the band $h$; also the transverse openings $d'$ for the bolts $g$ may then be formed.

By the above construction of the drum, it is rendered possible to materially reduce the weight of the hub, the amount of labor, and the cost of manufacture, while providing greater elasticity in the drum and increased efficiency in the hub as a whole without unduly weakening the same.

I claim:—

A pneumatic hub for vehicles, comprising a pair of flanges, an axle sleeve integral with one of said flanges, a wood spoke drum located between said flanges, a metal band fixed to and surrounding said drum, sockets for the spokes formed through said band and in said drum, a metal rim having flanges thereon and adapted to rotate around the axle sleeve, a pneumatic ring located within said rim and supporting said drum, and means to retain said parts in working position, as set forth.

In testimony whereof, I have hereunto set my hand in presence of two subscribing witnesses.

GEORGE MIDDLETON.

Witnesses:
GEORGE C. DOWNING,
T. J. OSMAN.